(12) United States Patent
Artur Du Plessis

(10) Patent No.: US 10,668,852 B2
(45) Date of Patent: Jun. 2, 2020

(54) METHOD FOR CONTROLLING THE OPERATION OF A REAR LIGHT SET OF A VEHICLE CAB

(71) Applicant: VOLVO TRUCK CORPORATION, Göteborg (SE)

(72) Inventor: Grégoire Artur Du Plessis, Lyons (FR)

(73) Assignee: VOLVO TRUCK CORPORATION, Göteborg (SE)

( * ) Notice: Subject to any disclaimer, the term of this patent is extended or adjusted under 35 U.S.C. 154(b) by 397 days.

(21) Appl. No.: 15/528,771

(22) PCT Filed: Dec. 17, 2014

(86) PCT No.: PCT/IB2014/003105
§ 371 (c)(1),
(2) Date: May 23, 2017

(87) PCT Pub. No.: WO2016/097787
PCT Pub. Date: Jun. 23, 2016

(65) Prior Publication Data
US 2019/0100132 A1    Apr. 4, 2019

(51) Int. Cl.
*B60Q 1/30* (2006.01)
*B60Q 1/22* (2006.01)

(52) U.S. Cl.
CPC ............... *B60Q 1/305* (2013.01); *B60Q 1/22* (2013.01)

(58) Field of Classification Search
CPC ......... B60W 30/165; B60W 30/18036; B60W 30/18154; B60Q 1/26; B60Q 1/346;
(Continued)

(56) References Cited

U.S. PATENT DOCUMENTS 8,165,770 B2 *  4/2012  Getman ............... B60T 8/1755
                                                                701/70
2017/0169703 A1 *  6/2017  Carrasco .............. B60Q 1/525

FOREIGN PATENT DOCUMENTS

CN         202463679 U      10/2012
CN         103648844 A       3/2014
(Continued)

OTHER PUBLICATIONS

International Search Report (dated Sep. 15, 2015) for corresponding International App. PCT/IB2014/003105.
(Continued)

*Primary Examiner* — Dedei K Hammond
*Assistant Examiner* — Amy X Yang
(74) *Attorney, Agent, or Firm* — Venable LLP; Jeffri A. Kaminski

(57) ABSTRACT

A method is provided for controlling the operation of a rear light set of a tractor of a vehicle, the rear light set including a plurality of rear lights, the vehicle further including a trailer which can be pivotably connected to the tractor about a substantially vertical axis and which includes the same set of rear lights. The method including: detecting whether a trailer is connected to the tractor; detecting a steering angle of the vehicle; if a trailer is detected to be connected to the tractor and if there is at least one activated rear light in the trailer rear light set: in case the steering angle of the vehicle is below a predetermined threshold, deactivating at least the rear light(s) of the tractor rear light set which is (are) of the same type as the activated rear light of the trailer rear light set; in case the steering angle of the vehicle is above the predetermined threshold, in a so-called manoeuvring operation, activating at least the rear light of the tractor rear light set which is of the same type as the activated rear light of the trailer rear light set and which is located outside of the turn.

14 Claims, 2 Drawing Sheets

(58) Field of Classification Search
CPC .......... B60Q 1/44; B60Q 1/0023; B60Q 1/22;
B60Q 1/305; B60Q 5/005; B60Q 5/006
USPC ......................................................... 315/77
See application file for complete search history.

(56) References Cited

FOREIGN PATENT DOCUMENTS

| | | |
|---|---|---|
| DE | 102006008276 A1 | 8/2007 |
| DE | 202010015919 A1 | 3/2011 |
| DE | 102013001280 A1 | 7/2014 |

OTHER PUBLICATIONS

Chinese Official Action (dated Jan. 30, 2018) for corresponding Chinese App. 201480084096.2.

\* cited by examiner

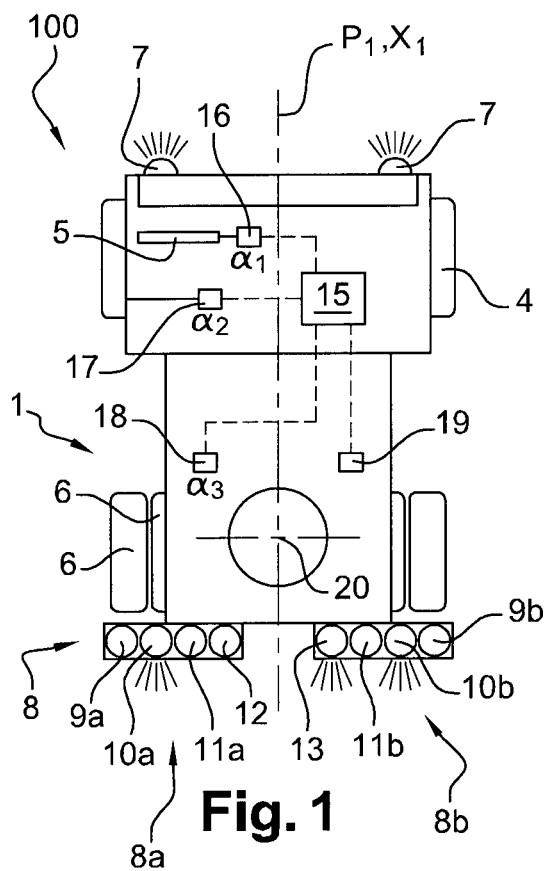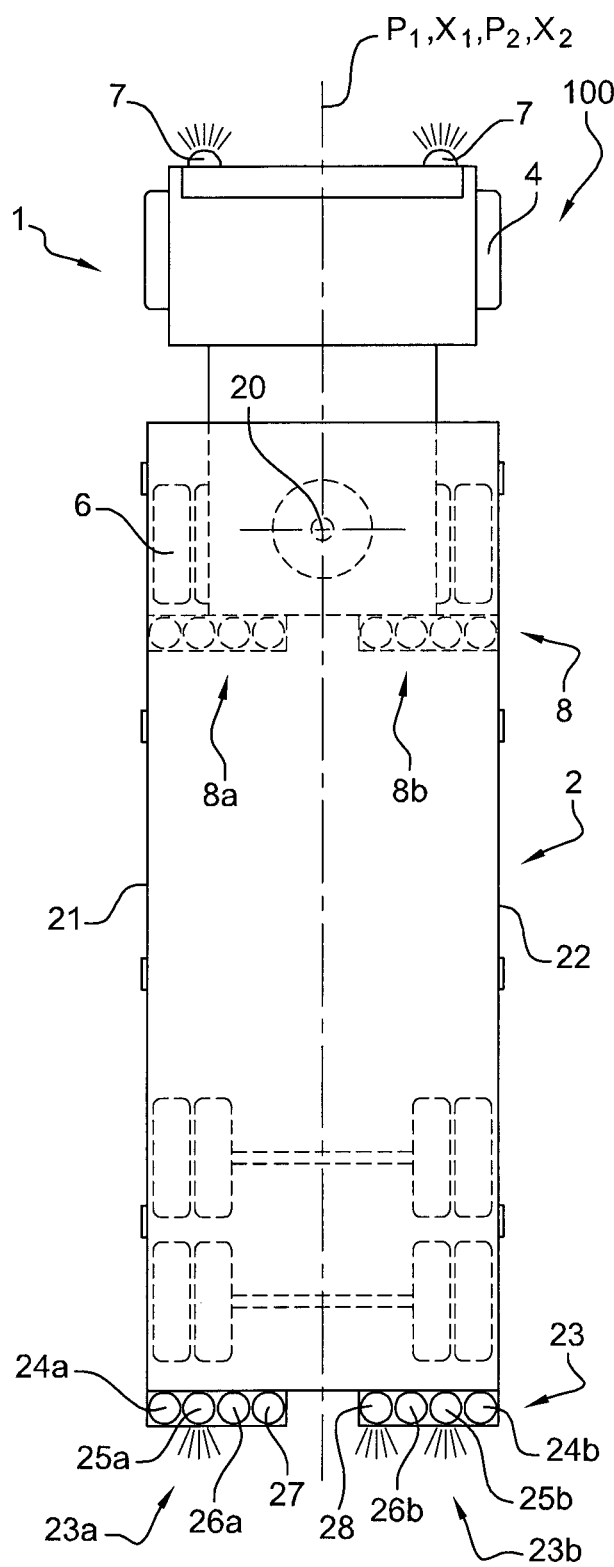
Fig. 1
Fig. 2

METHOD FOR CONTROLLING THE OPERATION OF A REAR LIGHT SET OF A VEHICLE CAB

BACKGROUND AND SUMMARY

The invention relates to a method for controlling the operation of a rear light set of a vehicle tractor. The invention also relates to a vehicle comprising a tractor and a trailer or a semi-trailer, each having a rear light set. The present invention is also applicable to a train comprising a tractor, a trailer or semi-trailer and one or more additional trailers.

The invention can be applied in heavy-duty vehicles, such as trucks and construction equipment. Although the invention will be described with respect to a truck, the invention is not restricted to this particular vehicle, but may also be used in other vehicles.

The function of the rear lights of a vehicle is to indicate to a person outside the vehicle—such as the driver of another vehicle or a pedestrian—where the vehicle is located, and what its next movements will be. The rear lights are activated or deactivated following the driver's action, depending on the conditions (night or day, weather, etc.) and on how the driver intends to move the vehicle (forward motion, turning movement, braking action, etc.).

In a vehicle comprising a tractor and a trailer pivotably connected to the tractor, the trailer is generally equipped with a rear light set which is identical to the rear light set arranged on the tractor. Thus, a person outside the vehicle can be informed by the rear lights actuation both when the vehicle only consists of the tractor and when a trailer is connected to the tractor.

However, when a trailer is connected to the tractor, most of the time, the rear lights of the tractor's rear light set are not visible, as they are hidden by the trailer. Then, only the rear lights of the trailer rear light set can provide the required information to a person outside the vehicle. Nevertheless, in such conventional vehicles, the driver's command entails the activation of the selected rear light(s) of both the tractor rear light set and the trailer rear light set. This results in a useless fuel consumption for activating the rear lights of the tractor.

It therefore appears that there is room for improvement in the operation of vehicles rear light sets.

It is desirable to provide a method for controlling the operation of a rear light set of a vehicle tractor which can be improved in terms of fuel consumption.

In case no trailer is connected to the tractor, the tractor rear light set can be operated as usual. On the contrary, when a trailer is connected to the tractor, the trailer rear light set replaces the tractor rear light set to provide the necessary information to a person outside the vehicle.

On the one hand, the method according to the invention provides deactivating the rear light(s) of the tractor rear light set when they cannot be seen by a person outside the vehicle because of the trailer, these rear light(s) thus being useless. This typically occurs when the tractor and the trailer are aligned or when the angle between their longitudinal axes is fairly low.

On the second hand, the method according to the invention provides activating the rear light(s) of the tractor rear light set even if a trailer is connected to the tractor and has the same rear light activated, in case the tractor rear light has become apparent/perceptible by a person outside tire vehicle. This typically occurs when the truck is turning, which results in the tractor and trailer axes not being aligned any more: in such a position, some rear light(s) of the tractor, or the beam emitted by said lights, are no longer hidden by the trailer but can be seen laterally. Then, the tractor rear light set and trailer rear light set duplicate each other and improve the vehicle overall system of light signals.

Thus, the invention makes it possible to reduce the vehicle fuel consumption without impairing safety, but activating the rear lights of the tractor rear light set only when necessary.

It has to be understood that the condition a>ath—or a<ath—is expressed in terms of absolute value.

According to an embodiment, the rear light of the tractor rear light set which is of the same type as the activated rear light of the trailer rear light set and which is located inside of the turn, if it exists, is maintained deactivated in the manoeuvring operation.

Indeed, said rear light of the tractor rear light set is generally not perceptible as it is hidden by the trailer when the vehicle is turning. With a method allowing controlling independently the rear lights of the tractor rear light set pertaining to a same pair, the method further improves fuel consumption. Alternatively, for example in order to simplify the controlling system, it could be envisaged to activate both rear lights of the pair, i.e. the rear lights of the tractor rear set which are of the same type and which are located on the outside/on the inside of the turn.

In the manoeuvring operation, the method according to the invention may comprise activating all the rear lights of the tractor rear light set which are of the same type as one activated rear light of the trailer rear light set and which are located at least partially beyond a trailer outside wall. In other words, ath is determined to achieve this result.

In the manoeuvring operation, the method according to the invention may comprise activating all the rear lights of the tractor rear light set which are of the same type as one activated rear light of the trailer rear light set and which emit a beam that can be seen by a driver of another vehicle or by a pedestrian. In other words, ath is determined to achieve this result.

Said predetermined threshold (ath) can range from 0.5° to 8°. For example, ath can be around 5°.

It may be envisaged to set a single threshold ath for all rear lights of the tractor rear light set. Alternatively, it may be envisaged to set a specific threshold ath for each given rear light of the tractor rear light set, depending on the distance between said given rear light and the tractor longitudinal median plane. Indeed, the farer a rear light is located from said plane, the sooner it becomes apparent when the vehicle turns, meaning the lower the threshold ath can be.

The method may further comprise deactivating all the rear lights of the tractor rear light set if a trailer is detected to be connected to the tractor, if there is at least one activated rear light in the trailer rear light set, and if the steering angle of the vehicle is below the predetermined threshold. In other word, in such an embodiment, it is not only the rear light(s) of the tractor rear light set which is (are) of the same type as the activated rear light of the trailer rear light set which is deactivated. This entails a further decrease in fuel consumption.

The steering angle of the vehicle can be detected:
using a sensor of the steering wheel angle;
using a sensor of the steering of the tractor wheels;
and/or using a sensor of the angle between the tractor longitudinal axis and the trailer longitudinal axis.

In practice, the rear light set can comprise at least one rear light among: a position light, a brake light, a reverse light, a fog light, a direction indicator.

The vehicle may further comprise a steering wheel angle sensor, a tractor wheel steering sensor, and/or an angle sensor capable of detecting the angle between the tractor longitudinal axis and the trailer longitudinal axis.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 1 is a schematic representation of a vehicle seen from the top, the vehicle comprising only a tractor;

FIG. 2 is a schematic representation of a vehicle seen from the top, the vehicle comprising a tractor and a trailer connected to the tractor, the tractor and trailer being substantially aligned;

DETAILED DESCRIPTION

Figure 3:
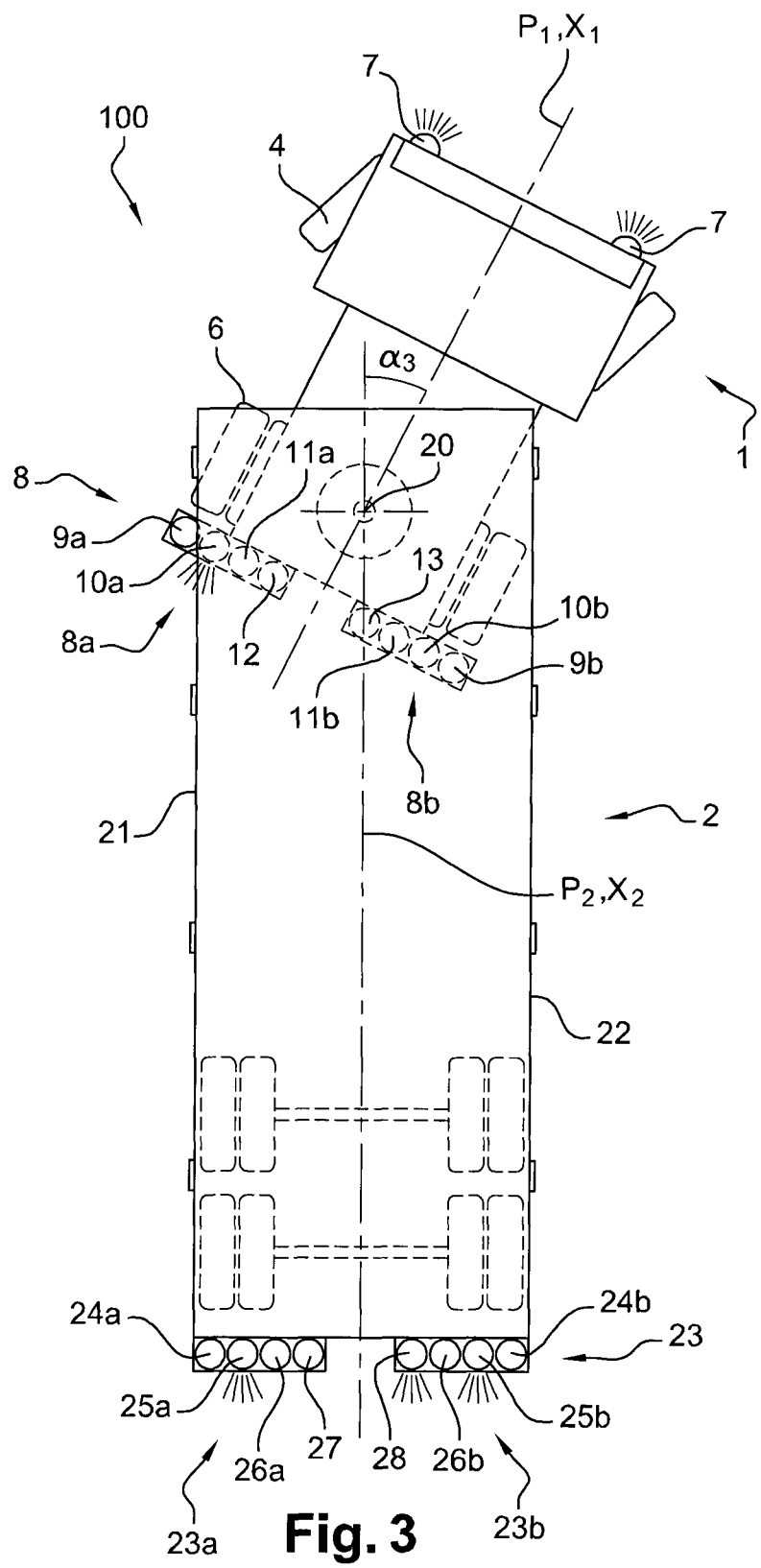
FIG. 3 is a representation similar to FIG. 2, the longitudinal axes of the tractor and the trailer forming between them an angle greater than a predetermined threshold.

FIG. 1 shows a vehicle 100 which comprises a tractor 1, and FIG. 2 shows the same vehicle 100 with a trailer 2 connected to the cab 1. The vehicle 100 described as a non limiting example is a heavy vehicle, and more specifically a truck.

The tractor 1 has a longitudinal median plane P1 and a longitudinal axis X1. It comprises front wheels 4 which can be turned following a driver's action on a steering wheel 5, and rear wheels 6.

The tractor 1 comprises a front light set, which can in particular include two headlights 7.

The tractor 1 further comprises a rear light set 8 comprising a plurality of rear lights which are arranged in two blocks, namely a left block 8a and a right block 8b, fastened to the tractor 1 substantially symmetrically with respect to P1. In the illustrated embodiment:
the left block 8a comprises, from left to right, i.e. when moving towards the plane P1: a direction indicator 9a, a position light 10a, a brake light 11a, and a reverse light 12;
the right block 8b comprises, from right to left, i.e. when moving towards the plane P1: a direction indicator 9b, a position light 10b, a brake light 11b, and a fog light 13.

In the illustrated embodiment, the following pairs of rear lights are substantially symmetrically arranged with respect to P1:
the direction indicators 9a, 9b;
the position lights 10a, 10b;
the brake light 11a, 11b;
the reverse light 2 and fog light 13.

As shown in FIG. 2, the trailer 2 can be pivotably connected to the tractor 1 about an axis 20 which is substantially vertical—when the vehicle 100 is on a substantially horizontal surface. The trailer 2 has a longitudinal median plane P2 and a longitudinal axis X2.

The tractor 1 further comprises an electrical control unit 15 connected to various devices of the vehicle 100 in order to receive information from these devices and/or to control these devices. In particular, in an embodiment, the vehicle 100 can comprise one or several of the following devices:
a steering wheel angle sensor 16 connected to the electrical control unit 5 and capable of detecting the steering wheel angle $\alpha 1$;
a tractor wheel steering sensor 17 connected to the electrical control unit 15 and capable of detecting the steering $\alpha 2$ of the tractor steered wheels, here the front wheels 4;
an angle sensor 18 capable of detecting the angle $\alpha 3$ between the tractor longitudinal axis X1 and the trailer longitudinal axis X2

Each of the angles $\alpha 1$, $\alpha 2$ and $\alpha 3$ can represent the steering, angle $\alpha$ of the vehicle 100.

The tractor 1 further comprises a trailer detector 19, connected to the electrical control unit 15 and capable of detecting whether a trailer 2 is connected to the tractor 1.

The trailer 2 comprises a left side wall 21 and a right side wall 22.

The trailer 2 further comprises a rear light set 23 comprising a plurality of rear lights which are arranged in two blocks, namely a left block 23a and a right block 23b, fastened to the trailer 2 substantially symmetrically with respect to P2. The trailer rear light set 23 is identical to the tractor rear light set 8 so that the information provided by the rear lights can be perceived by a person outside the vehicle 100, whether a trailer 2 is connected to the tractor 1 or not. However, the tractor 1, respectively the trailer 2, can further comprise additional rear lights that are not also present on the trailer 2, respectively the tractor 1.

Therefore, in the illustrated embodiment:
the left block 23a comprises, from left to right, i.e. when moving towards the plane P2: a direction indicator 24a, a position light 25a, a brake light 26a, and a reverse light 27;
the right block 23b comprises, from right to left, i.e. when moving towards the plane P2: a direction indicator 24b, a position light 25b, a brake light 26b, and a fog light 28.

In the illustrated embodiment, the following pairs of rear lights are substantially symmetrically arranged with respect to P2:
the direction indicators 24a, 24b;
the position lights 25a, 25b;
the brake light 26a, 26b,
the reverse light 27 and fog light 28.

In order to reduce the fuel consumption due to an unnecessary activation of one or several tractor rear lights, without impairing safety, the invention provides an improved method for controlling the operation of the tractor rear light set 8.

If no trailer 2 is connected to the tractor 1, which information is detected by the trailer detector 19 and sent to the electrical control unit 15, then the tractor rear light set 8 is operated conventionally. In other words, the driver's command entails the activation of the selected rear light(s) of both the tractor rear light set 8 and the trailer rear light set 23.

If the detector 19 detects that the trailer 2 is connected to the tractor 1, then the method according to the invention is implemented. The activation of the rear lights of the tractor 1 depends on the steering angle a of the vehicle 100, which steering angle a is detected or calculated from the detection of at least one of the angles $\alpha 1$, $\alpha 2$ and $\alpha 3$, as previously explained. The electrical control unit 15 receives the data corresponding to the steering angle α, and compares it to a predetermined threshold ath. In practice, this predetermined threshold ath can range from 0.5° to 8°, for example it can be around 5°.

In a first case, the tractor 1 and trailer 2 are substantially aligned, or α<ath, shown in FIG. 2. Then, none of the rear lights of the tractor rear light set 8 can be seen by a person outside the vehicle 100, because they are hidden by the trailer 2. Therefore, according to the invention, all rear lights of the tractor rear light set 8 are or remain deactivated, even if one or several lights of the trailer rear light set 23 is (are) activated.

In a second case, the steering angle a of the vehicle 100 is above said predetermined threshold (α>ath), which corresponds to, a so-called manoeuvring operation. In this case, at least some of the rear lights of the tractor rear light set 8 can be seen by a person outside the vehicle 100, despite the trailer 2.

Then, according to the controlling method of the invention, when a driver commands the activation of one type of rear light:
  the rear light(s) of this type which pertain(s) to the trailer rear light set 23 is (are) activated;
  and the rear light of this type which pertains to the tractor rear light set 8 and which is located outside of the turn is activated insofar as, above the predetermined threshold ath, said rear light can be seen by a person outside the vehicle 100 and thus provide useful information.

In practice, the rear lights of the tractor rear light set 8 which are activated can be located at least partially beyond a trailer outside wall, or can emit a beam that can be seen by a driver of another vehicle or by a pedestrian.

But the other rear lights of the tractor rear light set 8—including the rear light of said type which is located outside of the turn—can remain deactivated.

FIG. 3 shows an example of activation/deactivation of the rear lights of the tractor rear light set 8 in a manoeuvring operation, more precisely when the vehicle 1 turns tight. Thus, the outside of the turn is located on the left part of the vehicle 100.

The rear lights of the trailer rear light set 23 which are activated are the following: the left and right position lights 25a, 25b, the fog light 28. As a result, in the tractor rear light set 8:
  the left position light 10a is activated, because it is located outside of the turn;
  but the right position light 10b is deactivated, because this right position light 10b itself or its beam couldn't be seen by a person outside the truck;
  the fog light 13 is deactivated for the same reason;
  the other rear lights are not activated, because the rear lights of the same type of the trailer rear light set 23 are not activated.

One advantage of the invention is to save current consumption while the vehicle 100 is in motion, an ultimately to decrease fuel consumption. This fuel consumption reduction due to the invention is estimated between 0.03 and 0.9%, depending on the light technology (bulbs or LEDs) and on the operating conditions. This amount may not be significant for a single vehicle, but it entails meaningful gains for a vehicle fleet.

It is to be understood that the present invention is not limited to the embodiments described above and illustrated in the drawings; rather, the skilled person will recognize that many changes and modifications may be made within the scope of the appended claims.

The invention claimed is:

1. A method for controlling the operation of a rear light set of a tractor of a vehicle, the rear light set comprising a plurality of rear lights, the vehicle further comprising a trailer which can be pivotably connected to the tractor about a substantially vertical axis and which comprises the same set of rear lights, the method comprising:
  detecting whether a trailer is connected to the tractor;
  detecting a steering angle of the vehicle;
  if a trailer is detected to be connected to the tractor and if there is at least one activated rear light in the trailer rear light set:
  in case the steering angle of the vehicle is below a predetermined threshold, deactivating at least the rear light(s) of the tractor rear light set which is (are) of the same type as the activated rear light of the trailer rear light set;
    in case the steering angle of the vehicle is above the predetermined threshold, in a so-called manoeuvring operation, activating at least the rear light of the tractor rear light set which is of the same type as the activated rear light of the trailer rear light set and which is located outside of the turn.

2. The method according to claim 1, wherein the rear light of the tractor rear light set which is of the same type as the activated rear light of the trailer rear light set and which is located inside of the turn, if it exists, is maintained deactivated in the manoeuvring operation.

3. The method according to claim 1, wherein, in the manoeuvring operation, it comprises activating all the rear lights of the tractor rear light set which are of the same type as one activated rear light of the trailer rear light set and which are located at least partially beyond a trailer outside wall.

4. The method according to claim 1, wherein, in the manoeuvring operation, it comprises activating all the rear lights of the tractor rear light set which are the same type as one activated rear light of the trailer rear light set and which emit a beam that can be seen by a driver of another vehicle or by a pedestrian.

5. The method according to claim 1, wherein the predetermined threshold ranges from 0.5° to 8°.

6. The method according to claim 1, wherein it comprises deactivating all the rear lights of the tractor rear light set if a trailer is detected to be connected to the tractor, if there is at least one activated rear light in the trailer rear light set, and if the steering angle of the vehicle is below the predetermined threshold.

7. The method according to claim 1, wherein the steering angle of the vehicle is detected using a sensor of the steering wheel angle.

8. The method according to claim 1, wherein the steering angle of the vehicle is detected using a sensor of the steering of the tractor wheels.

9. The method according to claim 1, wherein the steering angle of the vehicle is detected using a sensor (18) of the angle between the tractor longitudinal axis and the trailer longitudinal axis.

10. A vehicle comprising:
  a tractor having a rear light set comprising a plurality of rear lights;
  a trailer which can be pivotably connected to the tractor about a substantially vertical axis and which comprises the same set of rear lights;
  a trailer detector capable of detecting whether a trailer is connected to the tractor;
  an angle detector capable of detecting a steering angle of the vehicle;

an electrical control unit arranged to:
   deactivate a rear light of the tractor rear light set when:
     at least one other rear light of the trailer rear light set of a same type is activated:
     and
     the steering angle of the vehicle is below a predetermined threshold: and
   activate a rear light of the tractor rear light set when:
     at least one other rear light of the trailer rear light set of the same type and located outside of a turn is activated: and
     the steering angle of the vehicle is above the predetermined threshold.

11. The vehicle according to claim 10, wherein the rear light set comprises at least one rear light among: a position light, a brake light, a reverse light, a fog light, a direction indicator.

12. The vehicle according to claim 10, wherein it further comprises a steering wheel angle sensor.

13. The vehicle according to claim 10, wherein it further comprises a tractor wheel steering sensor.

14. The vehicle according to claim 10, wherein it further comprises an angle sensor capable of detecting the angle between the tractor longitudinal axis and the trailer longitudinal axis.

\* \* \* \* \*